United States Patent
Dubost et al.

(10) Patent No.: US 9,875,384 B2
(45) Date of Patent: Jan. 23, 2018

(54) METHOD FOR READING AN IDENTIFICATION CODE ON A GLASS SHEET

(71) Applicant: SAINT-GOBAIN GLASS FRANCE, Courbevoie (FR)

(72) Inventors: Brice Dubost, Courbevoie (FR); Michele Schiavoni, Paris (FR); Guillaume Counil, Antony (FR); Emmanuel Mimoun, Boulogne Billancourt (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/117,852

(22) PCT Filed: Dec. 19, 2014

(86) PCT No.: PCT/FR2014/053481
§ 371 (c)(1),
(2) Date: Aug. 10, 2016

(87) PCT Pub. No.: WO2015/121549
PCT Pub. Date: Aug. 20, 2015

(65) Prior Publication Data
US 2016/0371523 A1    Dec. 22, 2016

(30) Foreign Application Priority Data
Feb. 11, 2014 (FR) .................................... 14 51029

(51) Int. Cl.
*G06K 7/10* (2006.01)
*G06K 7/14* (2006.01)
*G06K 19/06* (2006.01)

(52) U.S. Cl.
CPC ..... *G06K 7/10722* (2013.01); *G06K 7/10732* (2013.01); *G06K 7/1404* (2013.01); *G06K 7/1417* (2013.01); *G06K 19/06037* (2013.01)

(58) Field of Classification Search
CPC .......... B23K 26/362; G06K 19/06037; G06K 19/06028; G06K 19/086; G06K 7/10861;
(Continued)

(56) References Cited

U.S. PATENT DOCUMENTS

| 4,515,867 A | * | 5/1985 | Bleacher | ................. B44B 7/002 283/70 |
| 2002/0030817 A1 | * | 3/2002 | Matsumoto | ........ G06K 7/10861 356/401 |

(Continued)

FOREIGN PATENT DOCUMENTS

JP    2011-141724 A    7/2011

OTHER PUBLICATIONS

International Search Report as issued in International Patent Application No. PCT/FR2014/053481, dated Apr. 1, 2015.

*Primary Examiner* — Thien M Le
(74) *Attorney, Agent, or Firm* — Pillsbury Winthrop Shaw Pittman LLP

(57) ABSTRACT

A method for reading symbols forming a code, the symbols each being marked on one face of a number of glass sheets in proximity to the same edge face of the glass sheets, the glass sheets being arranged in a stack. The method includes acquiring, with a camera, at least one image via the edge face of the glass sheets, the observation direction being non-perpendicular and inclined relative to the edge face of each of the glass sheets the code of which is read with the image; and an image processing step in which the acquired
(Continued)

image is processed by a processor programmed to extract information present in at least one code visible in the image and having to be read.

18 Claims, 5 Drawing Sheets

(58) Field of Classification Search
CPC . H01J 2209/466; H01J 2209/463; G09F 3/00; G09F 3/0297; G05B 19/128; G05B 2219/23363
USPC .................................................. 235/462.11
See application file for complete search history.

(56) References Cited

U.S. PATENT DOCUMENTS

| | | | |
|---|---|---|---|
| 2005/0211789 A1* | 9/2005 | Hsieh ............... | G06K 19/06028 235/494 |
| 2009/0042109 A1* | 2/2009 | Okubo ..................... | G03F 1/60 430/5 |
| 2012/0040113 A1* | 2/2012 | Sato ..................... | G09F 3/0297 428/34.1 |

* cited by examiner

METHOD FOR READING AN IDENTIFICATION CODE ON A GLASS SHEET

CROSS-REFERENCE TO RELATED APPLICATIONS

This application is the U.S. National Stage of PCT/FR2014/053481, filed Dec. 19, 2014, which in turn claims priority to French Application No. 1451029, filed Feb. 11, 2014. The contents of all of these applications are incorporated herein by reference in their entirety.

The present invention relates to the field of identification codes marked on glass sheets.

It is possible to use one-dimensional "barcode" type symbols or analogous symbols and two-dimensional "Data Matrix" type symbols or analogous symbols as codes for identification of glass panels.

These codes may contain any type of information such as, for example, a number serving to identify the glass sheet. Information such as the manufacturing site or the time and date of manufacture may also be integrated, as well as information of any other suitable type.

The symbols are for example marked by means of a laser beam of any suitable type, preferably oriented perpendicularly to the glass sheet, i.e. to the general plane of the glass sheet. Specifically, the symbols thus marked are generally intended to be read from in front by positioning a device facing the symbol, and therefore facing one of the two main faces of the glass sheet.

This marking is for example produced in proximity to an edge face of the glass sheet.

However, such symbols are not intended to be read when the glass sheets are stacked.

One aim of the invention is to make it possible to read rapidly codes present on glass sheets, whether the glass sheets be separate or stacked.

According to one aspect of the invention, it is a question of a method for reading symbols forming a code, said symbols each being marked on one face of a number of glass sheets in proximity to the same edge face of the glass sheets, the glass sheets being arranged in a stack, the method comprising:

acquiring, with a camera, at least one image via said edge face of the glass sheets, the observation direction being non-perpendicular and inclined relative to said edge face of each of the glass sheets the code of which must be read with said image; and an image processing step in which the acquired image is processed by a processor programmed to extract information present in at least one code visible in the image and having to be read.

Particular embodiments of the method may furthermore comprise one or more of the following features or one or more technically feasible combinations of the following features:

said symbols are at most 10 mm from said edge face and preferably at most 7 mm, more preferably at most 5 mm and even more preferably at most 4 mm from said edge face;

the observation angle between the observation direction and the normal to the edge face of the glass sheet having to be read is chosen such that the deformation of the aspect ratio of the code is as small as possible;

the observation angle α between the observation direction and the normal to the edge face of the glass sheet having to be read is chosen such that Aspect ratio=cos(α)×tan(arcsin(sin(α)/n_glass)) is maximized;

the image is observed after one or more total internal reflections;

one image is acquired for each glass sheet of the stack of glass sheets, the camera being moved between each image so that the observation direction is non-perpendicular and inclined relative to the edge face of the glass sheet having to be read;

for each acquired image, at least some of the sheets of the stack are visible in the acquired image, the processing step using the portion of the image corresponding to the glass sheet having to be read;

for each acquired image the observation angle between the observation direction and the normal to the edge face of the glass sheet having to be read is identical;

a single image is acquired to read the code of a plurality of glass sheets of the stack, or only one image is acquired for all the glass sheets of the stack;

the camera is located far enough away that the observation angle between the observation direction and the normal to the edge face of the glass sheet having to be read is in a bracket of 40 degrees for each image acquired of the stack of glass sheets, and preferably in a bracket of 20 degrees;

the method comprises a step of applying, between the camera and the stack of glass sheets, a rigid transparent panel having, at the interface between the rigid transparent panel and the edge face of the stacked glass sheets, a transparent flexible or liquid material;

the transparent flexible or liquid material is water or a material based on silicone or an analogous material; and the rigid transparent panel is a glass sheet or a sheet of PMMA or an analogous material.

The invention will be better understood on reading the following description, given merely by way of illustrative example, which refers to the appended drawings, in which:

FIGS. 3, 3a and 3b illustrate a symbol as seen from above, a cross-sectional optical schematic explaining how this code is read via the edge face at an observation angle α, and the appearance of the code seen via the edge face at the angle α, respectively;

Figure 5:
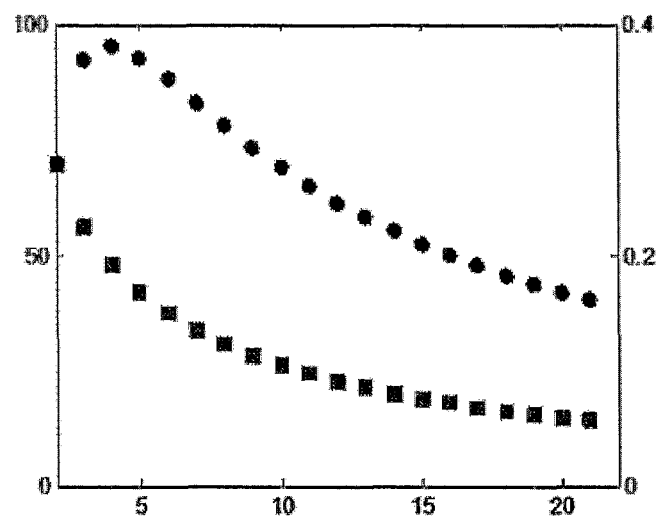
Figure 6:
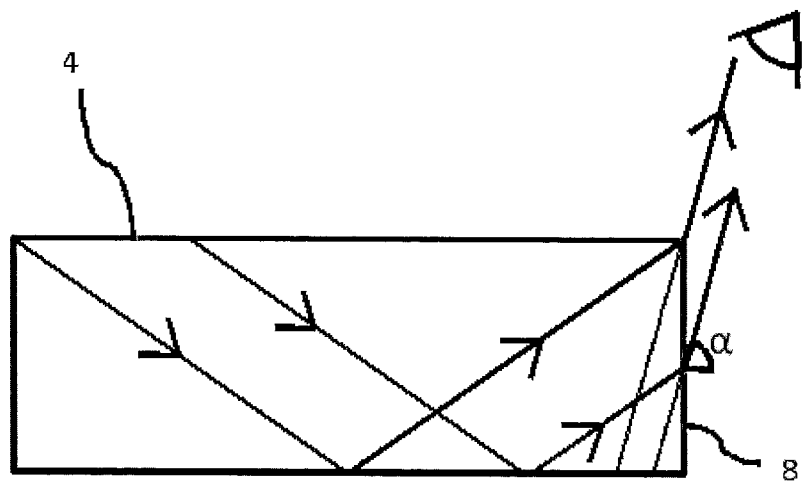
Figure 7:
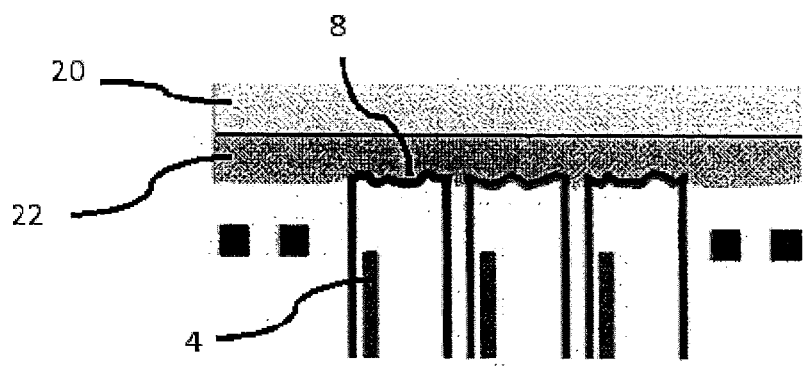
Figure 8:

in FIG. 3a) as a function of the observation angle α relative to the normal to the edge face of the glass sheet;

FIG. 5 illustrates the observation angle α required as a function of distance to the edge in millimeters and the aspect ratio at this distance and at this angle (size of the code set to 3 mm and thickness of the glass sheet set to 4 mm), and FIG. 5a shows photos of codes seen via the edge face at various observation angles α;

FIG. 6 is a schematic illustrating another embodiment for reading the code, using reflection of the image from the interior of the glass sheet;

FIG. 7 illustrates a method making it easier to read codes via the edge face, according to another embodiment; and FIG. 8 illustrates various types of symbols forming a code.

Throughout the text, the term "face" is understood to mean one of the two main faces of the glass sheet, and the term "edge face" one of the four edge faces forming the sides of the glass sheet.

Furthermore, the expression "observation direction" is understood to mean the axis between the objective of the camera and the observed point. The distance between the observer and the edge face is therefore large relative to the thickness of the sheet and hence every point on the edge face is considered to be observed at the same angle.

Furthermore, by way of example, in all the calculations, the refractive index of glass used is $n_{glass}=1.5$.

Figure 1:
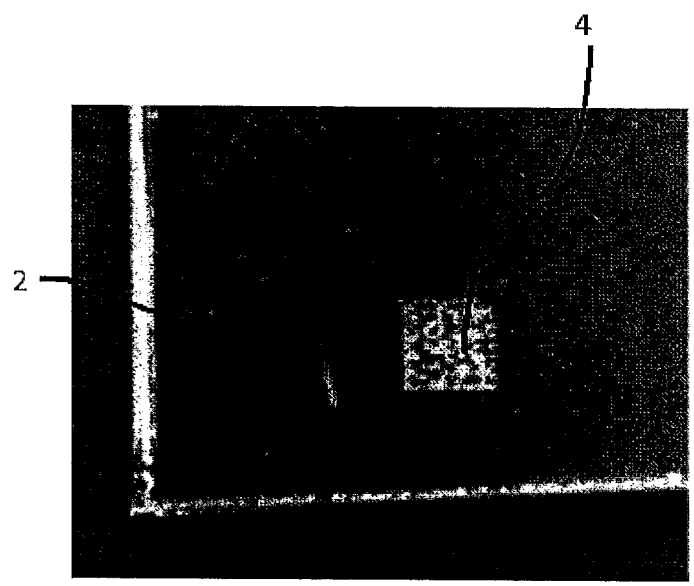
FIG. 1 is a photograph of a glass sheet, a "Data Matrix" type symbol being marked on the face of the glass sheet.

As illustrated in FIG. 1, each glass sheet 2 is marked with a symbol 4 forming a code.

The symbol 4 is preferably two-dimensional and for example a Data Matrix.

Figure 2:
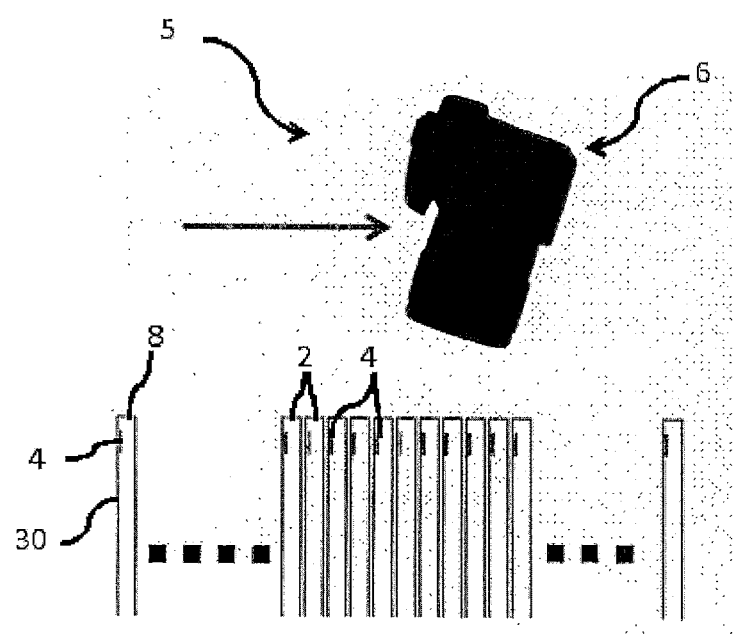
FIG. 2 is a schematic view illustrating a device for reading a stack of glass sheets according to one embodiment of the invention.

FIG. 2 illustrates one embodiment of the invention for reading these symbols when the glass sheets are stacked.

A reading device 5 comprising a camera 6 is positioned so as to observe the edge face 8 of the stacked glass sheets 2, for an observation via the edge face 8.

The reading device 5 also comprises a processor (not shown) connected to the camera 6 and comprising a memory (not shown) in which programs able to process the acquired images and decode the symbols 4 are stored.

Figure 3:
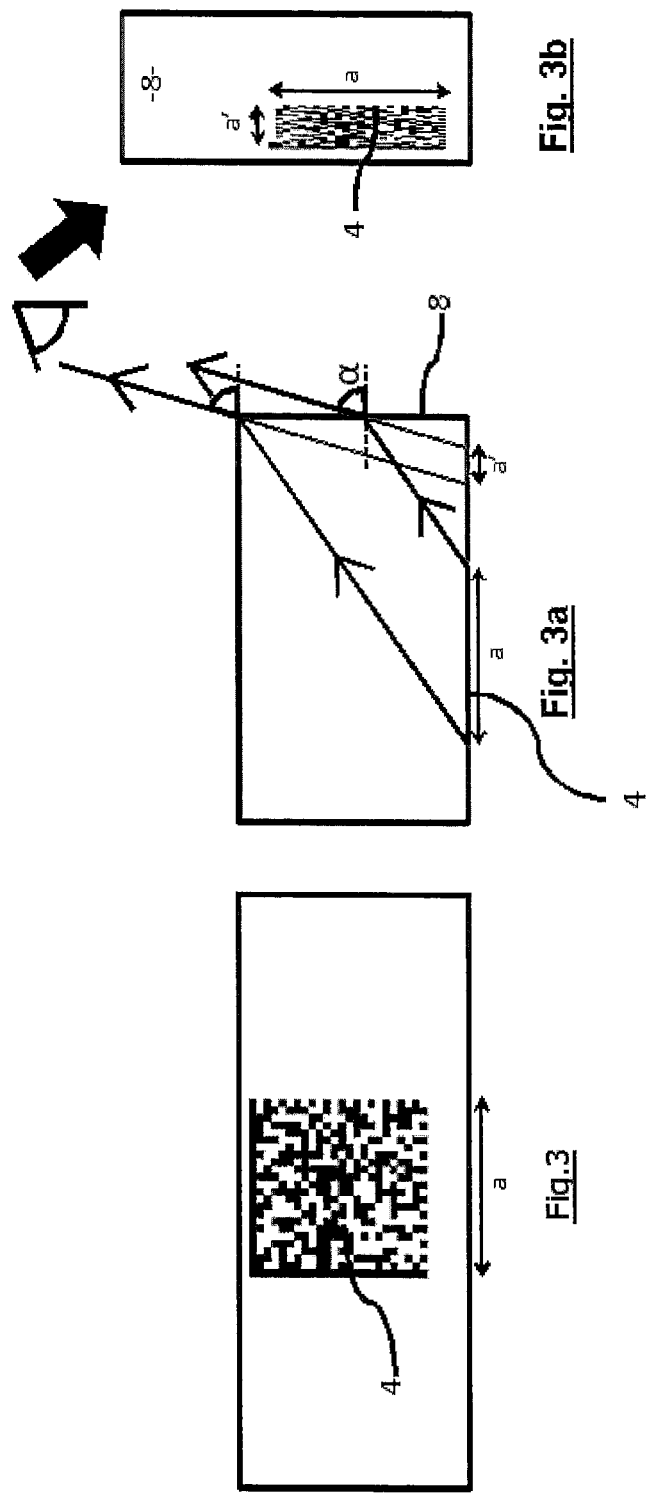

The symbols 4 are positioned close to one of the edge faces 8. This is because, as FIGS. 3 to 3b illustrate, the symbol appears deformed by the edge face because of two competing effects: refraction and projection. FIG. 3 corresponds to a front view, FIG. 3a to a cross-sectional view and FIG. 3b to a view through the edge face.

The smaller the observation angle $\alpha$ between the observation direction and the normal to the edge face, the more projection decreases the apparent size of the symbol (i.e. the size of the symbol such as it appears in the image taken by the camera). Furthermore, as the observation angle $\alpha$ increases, refraction becomes more dominant leading to a decrease in the apparent size of the symbol.

What is more, it is preferable, for the processing of the image, for the aspect ratio, i.e. the ratio of the apparent width of the symbol "a'" to its actual width "a", to be as high as possible. In practice, it is possible to obtain an aspect ratio of at least 0.2 or even at least 0.3.

Figure 4:
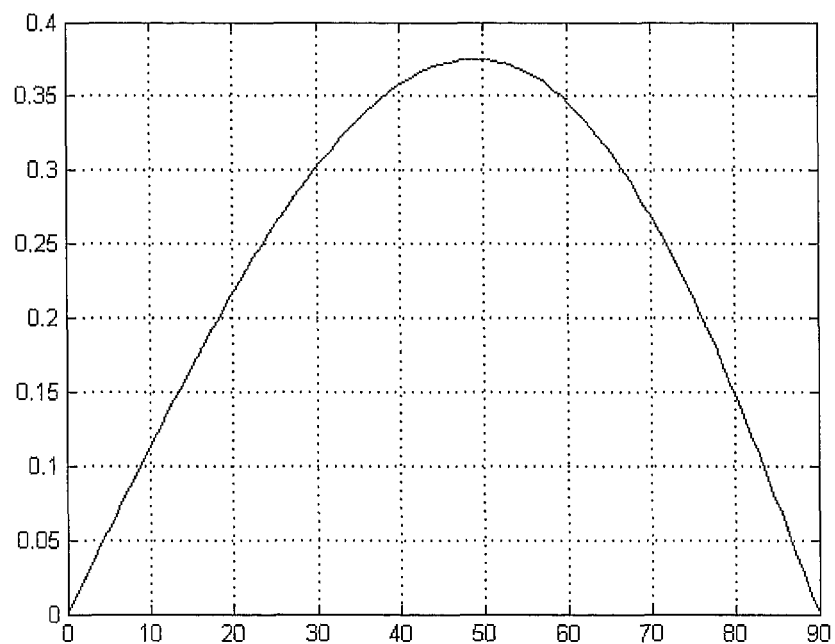
FIG. 4 is a graph illustrating the observed aspect ratio of the code (ratio $$\frac{a'}{a}$$

As illustrated in FIG. 4, it has been found that the observation angle $\alpha$ between the observation direction and the normal to the observed edge face reaches an optimal at about 50 degrees. The x-axis shows the angle $\alpha$ in degrees and the y-axis the aspect ratio $$\frac{a'}{a}.$$

The aspect ratio $$\frac{a'}{a}$$

of the apparent width a' of the object to its actual width a is given by:

$$\text{Aspect ratio} = \cos(\alpha) \times \tan\left(\arcsin\left(\frac{\sin(\alpha)}{n_{glass}}\right)\right)$$

where $\alpha$ is the observation angle between the observation direction and the normal to the edge face of the glass sheet and $n_{glass}$ is the refractive index of glass at 550 nm.

Preferably, the observation angle $\alpha$ is for example chosen to be between 30 and 70 degrees in the case of glass.

FIG. 5 for its part illustrates the role of distance to the edge, i.e. the distance between the symbol 4 and the edge face 8. The x-axis shows the distance to the edge in mm, the left-hand y-axis the observation angle $\alpha$ (square shaped points) and the right-hand y-axis the aspect ratio $$\frac{a'}{a}$$

(circular points).

If the spacing at the edge is larger, the room remaining in the viewing window will decrease. It is then necessary to use smaller viewing angles, and the compression due to projection increases (i.e. the aspect ratio $$\frac{a'}{a}$$

decreases).

Thus, under direct observation conditions (without reflection), the symbols are for example at most 10 mm from the nearest edge face and preferably at most 7 mm, more preferably at most 5 mm and even more preferably at most 4 mm from the nearest edge face.

By way of example, for a glass sheet of 4 mm thickness, a symbol of 1.2 mm size, an edge face of available width for the observation of 2.6 mm and a distance to the edge of 3.5 mm, the observation angle $\alpha$ is chosen to be 50°.

However, as illustrated in FIG. 6, symbols further away from the edge face may be read by an observation of the image in reflection.

For example, for a glass sheet of 4 mm thickness, the symbol will have an analogous appearance at a distance of +6 mm relative to a direct observation.

However, this solution of observation in reflection is in practice usable only in the case of a sufficiently clear glass, absorption being too great in the case of a tinted glass.

As regards the acquisition of the images, it may essentially be divided into two possible embodiments.

In the first embodiment, which is the preferred embodiment, either the stack of glass sheets or the reading device is movable, so as to acquire one image per glass sheet with the same observation angle $\alpha$ for each glass sheet 2.

However, it will be noted that in each image a plurality of edge faces 8 will for example be visible but only the symbol 4 corresponding to the sheet 2 having to be read will be processed by the processor.

In a second embodiment, one single image is acquired for the entire stack of glass sheets. To do this it will be preferable for the camera to be sufficiently far away that the angle of observation $\alpha$ is identical to within plus or minus 20 degrees, i.e. in a bracket of 40 degrees, and preferably to within plus or minus 10 degrees and more preferably to within plus or minus 5 degrees.

As a variant, a single image is acquired for a plurality of glass sheets 2, for example for groups of adjacent glass sheets of identical number, for example for groups of 2, 3 or 4 glass sheets. Furthermore, preferably, the image of each group is acquired with an identical angle of observation α.

FIG. 7 illustrates another possible embodiment, which may be combined with the preceding embodiments.

In this embodiment, the reading method consists in applying to the edge face of the stacked glass sheets, a transparent panel 20 having a flexible material 22 interposed at the interface between the panel and the edge face 8 of the glass sheets, so as to decrease optical defects resulting from surface defects present on the edge faces 8.

Specifically, it has proved to be the case that the cutting of the glass sheets 2 may lead to a poor readability through the edge face because of the surface finish of the edge face 8 after cutting.

The panel 20 is for example a rigid sheet made of transparent material, of glass for example.

The flexible material is for example a sheet made of a flexible transparent material 22, for example of plastic—of silicone for example.

The flexible sheet 22 is for example adhesively bonded to the panel 20 or fastened by any other suitable means.

As a variant, the flexible material is replaced by a liquid such as water or another analogous material, a colloid, etc.

Thus, before an image is acquired, the interface material is applied to the edge face, then the panel 20 is applied against the edge face 8 of the glass sheets of the stack, between the stack and the camera.

The glass sheets 2 for example have a thickness comprised between 0.5 and 19 mm and especially between 2 and 12 mm—between 4 and 8 mm for example. However, as a variant the glass sheets may be any suitable thickness.

The symbol 4 is for example marked immediately after the float glass ribbon has been cut into large glass sheets, or immediately before or even during the cutting. The glass sheet 2 then has a width larger than 2 meters and a length larger than 5 meters.

It is for example a question of soda-lime-silica glass but it may as a variant be any type of suitable glass.

Generally, it is a question of a glass sheet 2 of any suitable type.

It will also be noted that the symbol 4 shown in FIGS. 1 and 3 is not intended to be limiting. It may as a variant be a question of any type of suitable two-dimensional symbol. FIG. 8 illustrates other types of known codes, namely: 3-DI code, Aztex Code, Codablock, Code 1, Code 16K, Dot Code, QR Code, ezCode, BeeTagg Big, BeeTagg Landscape, Data Matrix, Maxicode, Snowflake, Vericode, BeeTagg Hexagon, BeeTagg None, ShotCode, MiniCode, Code 49, Datastrip Code, CP Code, and ISS SuperCode.

Generally, it is a question of a symbol 4 forming a code of any suitable type.

To carry out the marking of the symbol 4, a 50 W $CO_2$ marking laser is for example used. By way of example, the laser is able to alter the surface finish, color or even refractive index of the glass sheet and thus to mark the symbol 4 readably.

The marking device is placed facing a main face 30 (FIG. 2) of the glass sheet in order to mark the face 30 of the glass sheet.

The invention claimed is:

1. A method for reading symbols forming a code, said symbols each being marked on one main face of a plurality of glass sheets in proximity to a same edge face of the glass sheets, the glass sheets being arranged in a stack, the method comprising:
    acquiring, with a camera, at least one image via said edge face of the glass sheets, an observation direction being non-perpendicular and inclined relative to said edge face of each of the glass sheets the code of which to be read with said image; and
    performing an image processing step in which the acquired image is processed by a processor programmed to extract information present in at least one code visible in the image and having to be read.

2. The method as claimed in claim 1, wherein said symbols are at most 10 mm from said edge face.

3. The method as claimed in claim 2, wherein said symbols are at most 7 mm from said edge face.

4. The method as claimed in claim 3, wherein said symbols are at most 5 mm from said edge face.

5. The method as claimed in claim 4, wherein said symbols are at most 4 mm from said edge face.

6. The method as claimed in claim 1, wherein an observation angle (α) between the observation direction and a normal to the edge face of the glass sheet having to be read is chosen such that a deformation of an aspect ratio of the symbol is as small as possible.

7. The method as claimed in claim 6, wherein the observation angle (α) between the observation direction and the normal to the edge face of the glass sheet having to be read is chosen such that $$\text{Aspect ratio} = \cos(\alpha) \times \tan\left(\arcsin\left(\frac{\sin(\alpha)}{n_{glass}}\right)\right)$$

is maximized.

8. The method as claimed in claim 1, wherein the image is observed after one or more total internal reflections.

9. The method as claimed in claim 1, wherein one image is acquired for each glass sheet of the stack of glass sheets, the camera being moved between each image so that the observation direction is non-perpendicular and inclined relative to the edge face of the glass sheet having to be read.

10. The method as claimed in claim 9, wherein, for each acquired image, at least some of the sheets of the stack are visible in the acquired image, the image processing step using a portion of the image corresponding to the glass sheet having to be read.

11. The method as claimed in claim 10, wherein for each acquired image an observation angle (α) between the observation direction and a normal to the edge face of the glass sheet having to be read is identical.

12. The method as claimed in claim 1, wherein a single image is acquired to read the code of the plurality of glass sheets of the stack, or only one image is acquired for all the glass sheets of the stack.

13. The method as claimed in claim 1, wherein the camera is located far enough away so that an observation angle (α) between the observation direction and a normal to the edge face of the glass sheet having to be read is in a bracket of 40 degrees for each image acquired of the stack of glass sheets.

14. The method as claimed in claim 13, wherein the observation angle (α) is in a bracket of 20 degrees.

15. The method as claimed in claim 1, comprising applying, between the camera and the stack of glass sheets, a rigid transparent panel having, at the interface between the rigid transparent panel and the edge face of the stacked glass sheets, a transparent interface material.

16. The method as claimed in claim 15, wherein the transparent interface material is a liquid or an analogous material, or a flexible material based on silicone or an analogous material.

17. The method as claimed in claim 16, wherein the liquid is water.

18. The method as claimed in claim 15, wherein the rigid transparent panel is a glass sheet or a sheet of PMMA or an analogous material.

* * * * *